United States Patent [19]
Niestegge et al.

[11] Patent Number: 5,490,138
[45] Date of Patent: Feb. 6, 1996

[54] ATM COMMUNICATION SYSTEM

[75] Inventors: Gerd Niestegge; Volker Tegtmeyer, both of Munich; Hartmut Wolf, Peissenberg, all of Germany

[73] Assignee: Siemens Aktiengesellschaft, Munich, Germany

[21] Appl. No.: 312,061

[22] Filed: Sep. 26, 1994

Related U.S. Application Data

[63] Continuation of Ser. No. 89,554, Jul. 12, 1993, abandoned.

[30] Foreign Application Priority Data

Jul. 20, 1992 [DE] Germany ............................ 42 23 860.9

[51] Int. Cl.$^6$ ....................................................... H04J 3/14
[52] U.S. Cl. ............................ 370/56; 370/60; 370/85.15
[58] Field of Search ................................ 370/13, 16, 60, 370/60.1, 56, 85.13, 17, 85.7, 85.15, 94.1, 94.3; 340/825.05, 825.06, 825.07

[56] References Cited

U.S. PATENT DOCUMENTS

| | | | |
|---|---|---|---|
| 4,569,041 | 2/1986 | Takeuchi et al. | 370/60 |
| 4,766,590 | 8/1988 | Hamada et al. | 370/56 |
| 4,884,263 | 11/1989 | Suzuki | 370/16 |
| 5,007,043 | 4/1991 | van den Dool et al. | 370/60 |
| 5,034,738 | 6/1991 | Ishihara et al. | 370/85.15 |
| 5,140,585 | 8/1992 | Tomikawa | 370/60.1 |
| 5,179,548 | 1/1993 | Sandesara | 370/16.1 |
| 5,216,669 | 6/1993 | Hofstetter et al. | 370/84 |
| 5,233,604 | 8/1993 | Ahmadi et al. | 370/60 |
| 5,239,537 | 8/1993 | Sakauchi | 370/16 |

OTHER PUBLICATIONS

1986 International Zurich Seminar on Digital Communications; Mar. 11–13, 1986, pp. 25–32, Jonathan S. Turner, "New Directions in Communications".
"Communication Switching Systems", Murry Rubin and C. E. Haller, Reinhold Publishing Corporation, New York, 1966, pp. 218 and 219.

Primary Examiner—Douglas W. Olms
Assistant Examiner—Chau T. Nguyen
Attorney, Agent, or Firm—Hill, Steadman & Simpson

[57] ABSTRACT

A communication system working according to an asynchronous transfer mode comprises ATM communication equipment units connected to one another, whereby a plurality of concentrator equipment units are connected to at least one of the ATM communication equipment units. The concentrator equipment units together with the corresponding ATM communication equipment units are thereby arranged in a ring line system. Within this ring line system, each of the concentrator equipment units is connected via a separate virtual path to, on the one hand, the corresponding ATM communication equipment unit and, on the other hand, to each of the remaining concentrator equipment units. A plurality of virtual connections having defined transmission capacities can be respectively conducted via the individual virtual paths. Particulars with respect to the transmission capacities already occupied for established virtual connections are kept separately for the individual virtual paths in the corresponding ATM communication equipment units and are updated with every set-up and clear-down of a virtual connection. According to the measure of these particulars, a new virtual connection is thereby allowed only given a transmission capacity on the respective, virtual path that is still adequate.

8 Claims, 3 Drawing Sheets

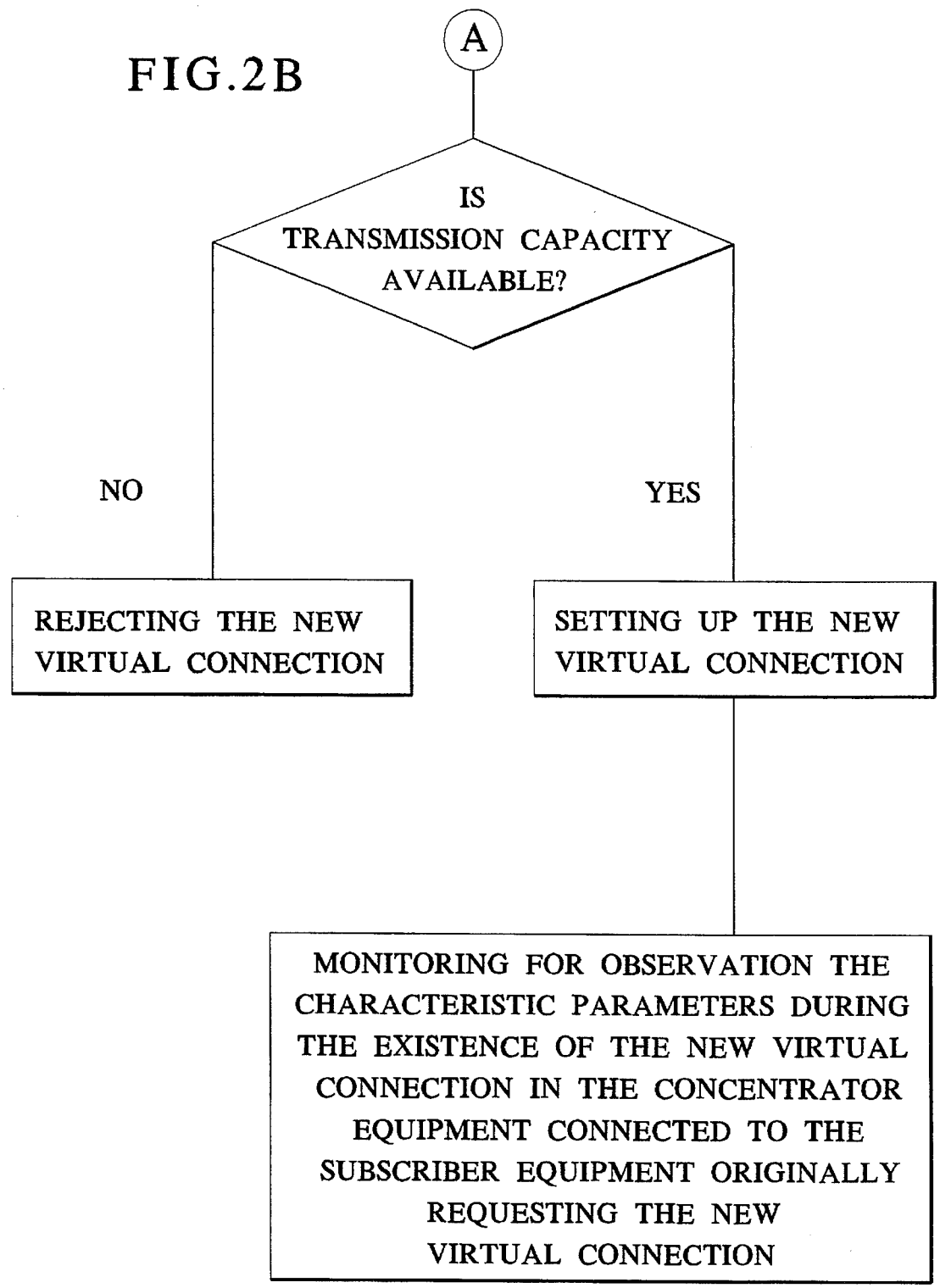

ATM COMMUNICATION SYSTEM

This is a continuation, of application Ser. No. 08/089,554, filed Jul. 12, 1993, abandoned.

BACKGROUND OF THE INVENTION

The invention is directed to a communication system for transmission of message cells according to an asynchronous transfer mode during the course of virtual connections. It has hitherto been provided in communication systems working according to an asynchronous transfer mode (ATM) that either the message cell traffic established by message cell streams of a plurality of subscriber equipment units are concentrated by a few, large, central concentrators, as a result whereof long, poorly utilized subscriber lines can arise between the subscriber equipment and the respective concentrator, or that a plurality of concentrators are established at a closer distance to the subscriber equipment, these being only capable of achieving a poor concentration because of only a few connected subscriber equipment units.

A further possibility is comprised in the employment of ATM concentrators and ATM multiplexers with add/drop functionality in a star or ring topology which concentrate or multiplex the message cell traffic established by different message cell streams onto different bundles or virtual paths with fixed band widths. Many small bundles or paths that, given the same blocking probability, are more poorly used than large bundles or paths, thus arise. An arrangement of concentrators in a ring topology of a communication system is already known ("Communication Switching Systems", Murry Rubin and C. E. Haller, Reinhold Publishing Corporation, N.Y., 1966, pages 218 and 219). In this known arrangement, two separate ring line systems connected to one another via a central processor are provided, a plurality of concentrators being respectively inserted into each of these. A plurality of subscriber equipment units are respectively connected to the individual concentrators. A message transmission between the subscriber equipment units and the central processor thereby occurs according to an inquiry/reply principle, whereby the message signals are transmitted in a free flow on an arbitrary basis without monitoring by the central processor. Beyond this, superimpositions of message signals as a consequence of disturbances are to be prevented by switch and memory means respectively present in the concentrators.

SUMMARY OF THE INVENTION

It is an object of the present invention to provide a way as to how a high concentration of message cell traffic can be achieved in a communication system of the type initially cited, while avoiding the above indicated disadvantages.

According to the invention, a communication system is provided for transmission of message cells according to an asynchronous transfer mode during the course of virtual connections. ATM communication equipment units are connected to one another. Concentrator equipment units are connected to at least one of the communication equipment units. A plurality of ATM subscriber equipment units are respectively connected to the concentrator equipment units. Concentrator equipment units together with the corresponding communication equipment units are arranged in a ring line system. Each of the concentrator equipment units is connected via a separate virtual path within the ring line system to, on the one hand, the corresponding communication equipment units and, on the other hand, to each of the other concentrator equipment units. Dynamically changing particulars with respect to the transmission capacity of the respective virtual path which is already occupied by established virtual connections are individually kept for the individual virtual paths in the corresponding communication equipment units according to the measure of the momentary traffic volume. The particulars with respect to the transmission capacity already occupied within the individual virtual paths are updated with every set-up and clear-down of a virtual connection. The set-up of virtual connections within the virtual paths is centrally controlled by the corresponding communication equipment units such that, given the presence of a request for a virtual connection, the virtual path coming into consideration for the corresponding virtual connection is first identified and is only released for the corresponding, virtual connection when a transmission capacity requested therefor is still available.

The invention provides the advantage that the set-up of virtual connections over the individual, virtual paths of the ring line system is controlled proceeding from a central location, so that a complete, common utilization of the transmission capacity in the ring line system by the individual, virtual connections occurs, and thus the distributed concentrator arrangement acts like a single, large concentrator toward the outside. Connected therewith is a high traffic concentration of the message cells transmitted proceeding from the subscriber equipment. At the same time, poorly used, long subscriber lines between subscriber equipment and a first concentrator are avoided. The network region having the concentrated message cell traffic is displaced closer to the subscriber equipment, so that the line costs that are especially significant in the subscriber line region in ATM communication systems can be considerably reduced.

BRIEF DESCRIPTION OF THE DRAWINGS

FIGS. 2A and 2B illustrate a flow chart of the communication method for transmission message cells according to an asynchronous transfer mode during the course of virtual connections in accordance with the invention.

DESCRIPTION OF THE PREFERRED EMBODIMENTS

Figure 1:
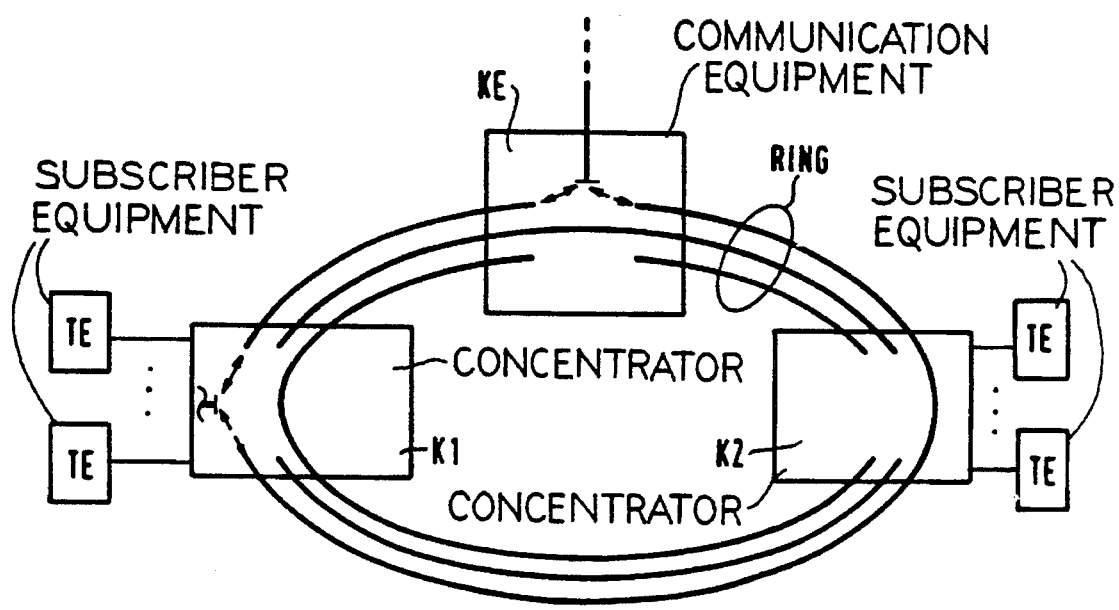
FIG. 1 illustrates in schematic block diagram format the ATM communication system according to the invention.

FIG. 1 schematically shows a communication equipment KE that belongs to an ATM communication system working according to an asynchronous transfer mode (ATM) and that, for example, is in communication with further communication equipment (not shown in the drawing) of this ATM communication system. This communication equipment KE which, for example, may be assumed to be an ATM switching equipment, is inserted into a ring line system RING together with a plurality of concentrators. Merely by way of an example, we therefore proceed on the basis of two such concentrators referenced K1 and K2. A plurality of subscriber equipment units TE or a plurality of equipment units connected to subscriber lines are thereby connected to each of these concentrators.

A virtual path is at least respectively semi-permanently established within the ring line system RING between, on the one hand, the communication equipment KE and the respective concentrator (K1 and K2), and on the other hand, between the individual concentrators, a plurality of virtual connections being capable of proceeding via these respective paths. Over and above this, a virtual standby path is established for each of these paths, this virtual standby path proceeding in the opposite direction and being utilized given outage of the regular virtual path. The individual virtual paths and standby paths are schematically shown in FIG. 1 by ring segments shown in the ring line system RING that respectively connect the communication equipment KE and one of the concentrators K1 and K2 or both concentrators to one another. With reference to the example of the communication equipment KE and the concentrator K1, the course of the respective regular and of the corresponding standby path is also indicated, namely the regular path by directional arrows connected with a solid line in the communication equipment E or in the concentrator K1, and, by contrast, the corresponding standby path by a directional arrow connected to a broken line.

Figure 2A:
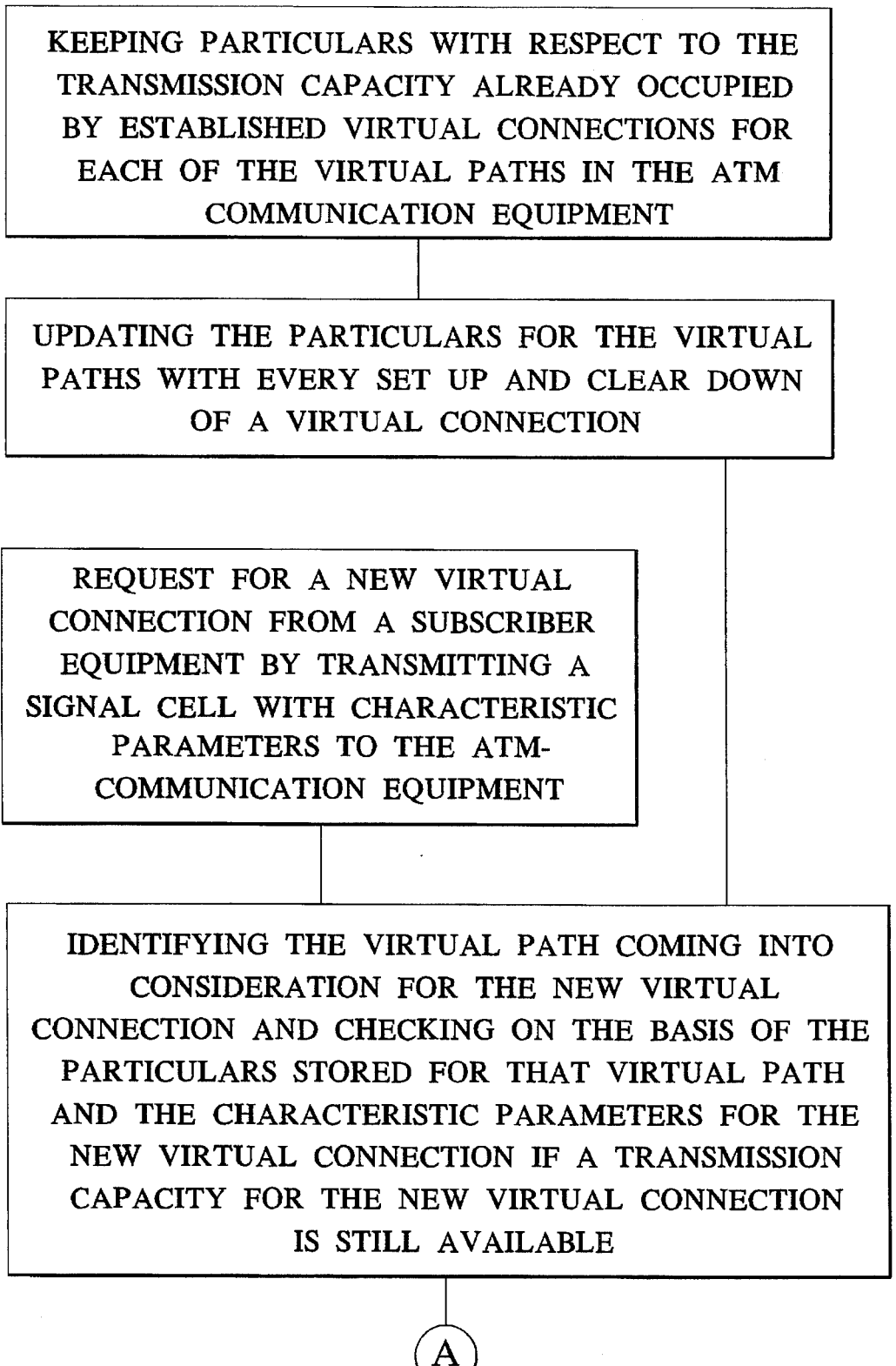

FIGS. 2A–2B is a flow diagram showing the communication method for transmission of message cells according to an asynchronous transfer mode during the course of virtual connections according to the invention.

No fixed allocation of a transmission capacity occurs within the virtual paths for the virtual connections proceeding therein; rather, this is dynamically reserved proceeding from the communication equipment KE for the individual virtual connections based on the measure of the transmission capacity requested during the course of the respective call set-up. For this purpose, particulars with respect to the transmission capacity already laid claim to by virtual connections that are already established are individually kept for the individual virtual paths in the communication equipment KE. These particulars are updated with every set-up and clear-down of a virtual connection, which is always sequenced under the control of the communication equipment KE.

As already mentioned above, a specific transmission capacity is requested for the set-up of a virtual connection proceeding from one of the subscriber equipment units TE (calling subscriber equipment) shown in the drawing. For this purpose, the respective subscriber equipment unit-communicates characteristic parameters in signalling cells transmitted during the course of the call set-up, the respective transmission bit rate being defined by these characteristic parameters. These characteristic parameters, for example, can thereby be a matter of information with respect to a peak bit rate and/or an average bit rate.

On the basis of the signalling cells transmitted proceeding from a calling subscriber equipment TE during the course of the respective call set-up, the communication equipment KE determines the virtual path coming into consideration for this virtual connection, and on the basis of the bit rate information kept for the corresponding virtual path, checks to see whether a bit rate capacity that is adequate for the virtual connection now to be set up is still available. When this is the case, then this virtual connection is set up and a corresponding transmission bit rate capacity is reserved for the entire duration of the call. Otherwise, the virtual connection requested at the moment is rejected.

Given an existing virtual connection, the observation of the afore-mentioned, characteristic parameters is monitored exclusively in that concentrator (K1, K2) which is connected to the calling subscriber equipment coming into consideration for this virtual connection, so that the communication equipment KE is relieved of such monitoring functions. Known monitoring equipment can be provided in the concentrators for this call-associated monitoring. As an example, let what are referred to as "leaky bucket" counters be cited here.

Although various minor changes and modifications might be suggested by those skilled in the art, it will be apparent that we wish to include within the claims of the patent warranted hereon, all such changes and modifications as reasonably come within our contribution to the art.

We claim as our invention:

1. A communication method for transmission of message cells according to an asynchronous transfer mode during the course of virtual connections, comprising the steps of:

providing ATM communication equipment units connected to one another;

providing concentrator equipment units connected to at least one of the communication equipment units;

providing a plurality of ATM subscriber equipment units connected to respective concentrator equipment units, said concentrator equipment units concentrating message cell streams from the subscriber equipment units;

arranging the concentrator equipment units together with the corresponding communication equipment unit in a ring line system;

connecting each of the concentrator equipment units via separate virtual paths within the ring line system directly to the corresponding communication equipment unit and connecting each of the concentrator equipment units directly to each other via separate virtual paths in the ring line system;

individually keeping, for individual virtual paths in the corresponding communication equipment unit, a current transmission bit rate occurring on each respective virtual path which is already occupied by currently established virtual connections, the current transmission bit rate being formed from a combination of bit rates of each of the currently existing virtual connections so that said current transmission bit rate represents a measure of momentary traffic volume, said current transmission bit rate dynamically changing as traffic volume changes;

updating the current transmission bit rate for an associated virtual path with every set-up and clear-down of a virtual connection;

centrally controlling by the corresponding communication equipment unit the set-up of virtual connections within the virtual paths such that, given presence of a request for a new virtual connection, identifying a virtual path coming into consideration for the new virtual connection, comparing for that virtual path a current transmission bit rate with a maximum capacity transmission bit rate for that virtual path to determine whether sufficient capacity for the new virtual connection is still available; and if the transmission bit rate capacity is still available on the particular virtual path, only then setting up the new virtual connection on that virtual path.

2. A communication method according to claim 1 including the step of prescribing with the respective subscriber equipment unit characteristic parameters defining the bit rate for the new virtual connection during the course of the set-up of the new virtual connection.

3. A communication method according to claim 2 wherein the bit rate comprises a peak bit rate.

4. A communication method according to claim 2 wherein the bit rate comprises an average bit rate.

5. A communication method according to claim 1 including the step of providing said ring line system with a stand-by path in an opposite direction allocated to each of the virtual paths.

6. A communication method according to claim 1 wherein if transmission bit rate capacity is available, setting up the new virtual connection, and if transmission bit rate capacity is not available, rejecting the new virtual connection.

7. A communication method according to claim 1 wherein the respective subscriber equipment unit communicates bit rate information in signalling cells transmitted during the course of the call's set-up.

8. A communication method for transmission of message cells according to an asynchronous transfer mode during the course of virtual connections, comprising the steps of:

providing ATM communication equipment units connected to one another;

providing concentrator equipment units connected to at least one of the communication equipment units;

providing a plurality of ATM subscriber equipment units connected to respective concentrator equipment units;

arranging the concentrator equipment units together with the corresponding communication equipment unit in a ring line system;

connecting each of the concentrator equipment units via separate virtual paths within the ring line system to the corresponding communication equipment unit and connecting each of the concentrator equipment units to each other via separate virtual paths in the ring line system;

individually keeping, for individual virtual paths in the corresponding communication equipment unit, a current transmission bit rate occurring on each respective virtual path which is already occupied by currently established virtual connections, the current transmission bit rate being derived from bit rates of each of the currently existing virtual connections so that said current transmission bit rate represents a measure of momentary traffic volume, said current transmission bit rate dynamically changing as traffic volume changes;

updating the current transmission bit rate for an associated virtual path with every set-up and clear-down of a virtual connection;

centrally controlling by the corresponding communication equipment unit the set-up of virtual connections within the virtual paths such that, given presence of a request for a new virtual connection, identifying a virtual path coming into consideration for the new virtual connection, comparing for that virtual path a current transmission bit rate with a maximum capacity transmission bit rate for that virtual path to determine whether sufficient capacity for the new virtual connection is still available;

if the transmission bit rate capacity is still available on the particular virtual path, only then setting up the new virtual connection on that virtual path; and exclusively monitoring the bit rate of the currently existing virtual connections in the respective concentrator connected to the respective calling subscriber equipment unit coming into consideration for the respective virtual connection so that the at least one communication equipment unit to which the concentrator equipment units are connected is relieved of said monitoring.

* * * * *